(12) United States Patent
Picciotto et al.

(10) Patent No.: US 9,335,097 B2
(45) Date of Patent: May 10, 2016

(54) ELECTRODE FOR DIRECT CURRENT CONTINUOUS ARC FURNACE

(75) Inventors: Maurizio Picciotto, Udine (IT); Marco Ansoldi, Udine (IT); Stefano Morsut, Palmanova (IT); Alfredo Poloni, Fogliano Redipuglia (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 864 days.

(21) Appl. No.: 13/261,323

(22) PCT Filed: Dec. 15, 2010

(86) PCT No.: PCT/EP2010/069730
§ 371 (c)(1),
(2), (4) Date: Jun. 15, 2012

(87) PCT Pub. No.: WO2011/073244
PCT Pub. Date: Jun. 23, 2011

(65) Prior Publication Data
US 2012/0269225 A1    Oct. 25, 2012

(51) Int. Cl.
*H05B 7/06* (2006.01)
*F27D 99/00* (2010.01)
*F27B 3/24* (2006.01)
*F27D 11/04* (2006.01)
*H05B 7/12* (2006.01)
*C21C 5/52* (2006.01)

(52) U.S. Cl.
CPC ............. *F27D 99/0006* (2013.01); *F27B 3/24* (2013.01); *F27D 11/04* (2013.01); *H05B 7/12* (2013.01); *C21C 5/5229* (2013.01); *Y02P 10/216* (2015.11)

(58) Field of Classification Search
CPC ........ F27D 99/0006; F27D 11/04; F27B 3/24
USPC ........... 373/18, 72, 74, 76, 42, 44, 45, 71, 94, 373/108, 93, 88
See application file for complete search history.

(56) References Cited

U.S. PATENT DOCUMENTS 4,101,725 A * 7/1978 Shelepov et al. ............... 373/18
6,031,861 A * 2/2000 Koster ............................ 373/72

FOREIGN PATENT DOCUMENTS

CN         1210659      3/1999
JP         H3279779     12/1991

* cited by examiner

*Primary Examiner* — Phuong Nguyen
(74) *Attorney, Agent, or Firm* — Stetina Brunda Garred & Brucker (57) ABSTRACT

Bottom electrode or anode for continuous direct current arc furnaces, provided with a cooling system which allows to improve the effectiveness of the cooling action of the bottom electrode, made in the shape of bimetallic billet, for the purpose of ensuring a sufficient height of the portion of said electrode which remains solid during the operation of the furnace, also when there is a very high electric load.

13 Claims, 6 Drawing Sheets

ELECTRODE FOR DIRECT CURRENT CONTINUOUS ARC FURNACE

FIELD OF THE INVENTION

The present invention refers to an electrode for direct current continuous arc furnaces, used in particular as anode on the bottom of said furnaces.

STATE OF THE ART

Direct current continuous arc furnaces (DC EAFs) are used in the steel technology for melting and refining iron-based metal alloys.

In these furnaces, the electric arc is discharged between at least a graphite electrode arranged at the top (cathode) and at least a bottom electrode (anode) arranged at the bottom in the hearth of the furnace. The passing of the current allows the formation of the electric arc whose effects of radiation and convection make the iron scrap to melt.

With respect to an alternate current arc furnace (AC EAF), the direct current arc furnace advantageously permits to have a lower consumption of electric energy, a lower consumption of electrodes and of refractories, uniform and fast melting of the scrap iron (because of the great length of the arc obtainable), a decrease in the noise and in the mechanical stresses and good stewing of the liquid metal bath. Furthermore, the variations of reactive power and the "flicker" effect are significantly less.

Typically continuous direct current arc furnaces have a top electrode or cathode, associated with the crown of the furnace and which extends inside the furnace itself, and a plurality of lower electrodes or bottom electrodes or anodes incorporated in the refractory hearth of the furnace for closing the electric circuit. In these furnaces the anodes are one of the most delicate components as they are crossed by currents having very high intensity and are subject to significant thermal stresses and magnetic forces.

Various types of bottom electrodes belong to the state of the art.

Such bottom electrodes are, for example, made in the shape of metal bars, incorporated in the refractory hearth of the furnace, which partially extend at the bottom end thereof outside of the furnace itself. The number of said bars and the arrangement thereof, which is symmetrical with respect to the middle of the furnace, depends on the power of the furnace and on the conformation of the hearth thereof.

According to another type of bottom electrode, said metal bars may be divided into a plurality of billets having very small diameter, which are bottomly fixed on a common plate, generally air-cooled and connected to the power supply by means of water-cooled pipes.

In another known embodiment, in place of the billets, each electrode unit may consist of a plurality of metal tabs welded on a common metal support and arranged in cooperation with other electrode units so as to form a ring, which is concentric to the furnace.

According to the known art, the bar type electrodes may be made entirely in steel or in steel and copper.

The top steel part of said bars being in contact with the melted metal bath, it melts up to a certain height. According to the efficiency of the cooling, the bar has a top liquid part and a lower solid part, divided by a separation zone.

In this type of bottom electrode, the main problem is the one of developing a cooling system capable of ensuring a solid lower part, along the height of the bar, which is as extended as possible also under conditions of high electric and thermal load conducted by said bottom electrodes.

Among other things, there is a need for this to prevent the formation of possible escape routes for the melted metal. If, indeed, the fusion front within the anode should continue to the complete perforation of the base of the anode, contact would occur of the liquid metal with the water or other cooling liquid used to cool down the base of the anode thus causing a true explosion with significantly dangerous consequences.

Various solutions have been proposed to obtain improved thermal efficiency of the cooling action of the bottom electrodes.

A first solution provides the use of a bimetallic steel-copper anode in the shape of billet, equipped with channels for the passage of a fluid in order to cool down the copper part, similarly to a continuous casting crystallizer. The heat exchange mechanism is the one of forced convection with a single-phase fluid (water in the liquid state). The movement of the cooling fluid substantially occurs parallel to the surface to be cooled down, which requires a certain speed and a certain dimension of the channels to ensure an adequate heat exchange.

This solution is adequate if the currents employed are not high. When the currents increase there is a need to increase the diameters and the flows while however keeping the sections of the passage channels as unaltered as possible so as to in turn keep unaltered the speed of the fluid on which the heat exchange coefficients depend. Given that under such conditions, the deformations of the metal structures may be enormously amplified, the channels through which the cooling fluids pass will also be modified with possible significant decreases of the heat exchange. These phenomena may seriously jeopardize the integrity of the structure of the anode with consequences on the operation of the furnace.

Instead, a second solution provides the use of a bimetallic steel-copper anode equipped with a cooling system, within the copper part of the anode, which uses a two-phase cooling fluid (liquid-gaseous) by means of drop atomization and the successive boiling thereof when they come in contact with the surface to be cooled down. The phase transition (the so-called "boiling") permits to efficiently remove the heat but, disadvantageously, only up to a critical temperature. There is a rapid decay of the heat exchange properties beyond this critical temperature which therefore leads to poor system reliability. If the complete perforation should occur of the base of the anode, a series of barriers is provided for blocking the leakage of the melted fluid into the housing of the cooling system, thus however involving increased construction complexity.

Thus the need is felt to make a bottom electrode which allows the overcoming of the aforesaid drawbacks.

SUMMARY OF THE INVENTION

It is the primary object of the present invention to provide a bottom electrode or anode for continuous direct current arc furnaces, provided with a cooling system which is capable of ensuring a solid part, along the longitudinal extension of the billet, which is the highest possible also under conditions of high electric load in order to constantly ensure an adequate distance between the solid-liquid interface of the anode and the cooling water and, accordingly, absolute safety.

Another object of the invention is to obtain efficiency of the cooling action of the bottom electrode, made in the shape of bimetallic billet, highly superior to that possible to date, by optimizing the heat exchange by means of a particular geometry of the cooling channels.

A further object of the present invention is simultaneously ensuring that the conditions are kept of optimal thermal and electrical conduction at the junction zone between the cooled part and the uncooled part of the billet, thus obtaining improved furnace operation in terms of production efficiency, increased duration of the electrode, increased reliability and safety.

Thus the present invention proposes to achieve the objects discussed above by making an electrode for continuous direct current arc furnace for melting metals, adapted to be accommodated in a bottom of said furnace, which, according to claim 1, comprises a bimetallic bar, defining a longitudinal axis X, comprising along the longitudinal extension thereof a first steel portion, a first end of which is adapted to come in contact with a metal bath within the furnace, and a second copper portion welded to a second end of said first steel portion;

cooling means to cool down said bimetallic bar;

a cavity obtained within said second copper portion in which said cooling means are at least partially accommodated;

a gap between said cavity and said cooling means;

in which the cooling means comprise a collector, placed at a first end of the cooling means, having an end wall provided with a plurality of channels which put said collector into communication with a first portion of said gap which is proximal to said first steel portion;

a first pipe for conveying a cooling liquid towards the collector;

in which, with respect to said longitudinal axis X, the collector has a cross section area of at least 1.5 times the cross section area of the first pipe with respect to said longitudinal axis, and in which each of the channels has a longitudinal axis thereof substantially perpendicular to a plane tangent to the respective outlet section, whereby a plurality of cooling liquid jets substantially perpendicular to a primary surface of the cavity proximal to said first steel portion is generated in the first portion of the gap.

A second aspect of the present invention provides a cooling process of the aforesaid electrode which, according to claim 13, comprises the following steps:

filling the gap provided between the cavity and the cooling means, with a cooling liquid;

continuously introducing further cooling liquid into the first pipe, whereby said cooling liquid reaches the collector;

primary cooling the electrode by a continuous leakage of a plurality of cooling liquid jets, through the plurality of channels, which substantially perpendicularly strike the corresponding portions of the primary surface in the first portion of the gap proximal to the steel portion of the electrode;

secondary cooling the electrode by means of a subsequent descending flow of the cooling liquid in the second portion of the gap distal from the steel portion of the electrode.

Advantageously, the solution of the invention uses the heat exchange by convection mechanism by using a single-phase fluid, preferably water in the liquid state. The cooling action is advantageously double.

Primary cooling is generated by means of moving the cooling liquid substantially in perpendicular direction with respect to the wall to be cooled down, thus taking advantage of the strike ("impinging") of the jets to remove heat. The characteristic of the perpendicularity of the confined jets permits to free the distance of the cooling system from the primary surface of the anode to be cooled down, thermal exchange being equal. Therefore a clearance or greater distance may be provided between said primary surface and the outlet section of the injection holes of the cooling liquid so that the mechanical deformations of the anode, under the effect of the high current, do not influence on the efficiency of the cooling, as instead occurred in the first solution of the state of the art.

Moreover, with the jets it is possible to increase the speed of the liquid by simply varying the section of the jet, therefore without intervening on the increase in flow. It is therefore possible to separate the speed of the liquid from its flow.

Instead, secondary cooling is generated by moving the cooling liquid substantially in direction parallel to the surface to be cooled down. Such a secondary cooling already manifests itself in the zone of the plate or holed cap, since after having struck the curved surface of the electrode jacket, the liquid of the jets tends to lap it until it reaches the vertical walls of the meatus or gap between electrode jacket and the cooling lance, in which the liquid then descends vertically in direction parallel to the corresponding surface of the anode, thus going towards the discharge section.

The cooling system of the electrode of the invention operates as a single-phase (only water, no air within the system) and closed system. Said system may operate indifferently with high or low outlet pressure.

The number of holes of the plate or holed cap depends on the surface to be cooled down. Injection nozzles of the cooling liquid may also be provided.

The use of the bimetallic steel-copper billet permits to ensure an excellent electrical conductivity and to extend the cooling effects in direction of the liquid steel bath. This permits to keep the solid-liquid interface of the steel as far as possible from the cooled zone. An efficient cooling system permits to further improve this aspect by significantly increasing the safety factors.

The dependent claims describe preferred embodiments of the invention.

BRIEF DESCRIPTION OF THE FIGURES

Further features and advantages of the invention will be more apparent in light of the detailed description of a preferred, but not exclusive, embodiment of an electrode for continuous direct current arc furnaces, shown by way of non-limiting example, with the aid of the accompanying drawings in which:

FIG. 6b shows a top view of the component in FIG. 6a.

DETAILED DESCRIPTION OF A PREFERRED EMBODIMENT OF THE INVENTION

With reference to the figures, a first embodiment of an electrode for continuous direct current arc furnaces is represented, globally indicated with reference numeral 1, in particular a bottom electrode or anode to be incorporated within the refractory hearth of said furnaces.

The electrode 1, object of the present invention, comprises:
a bar or bimetallic billet 2, preferably having a top part in steel and a bottom part in copper conveniently welded with each other;
cooling means 3, accommodated within the bottom copper part of the billet 2.

Figure 1:
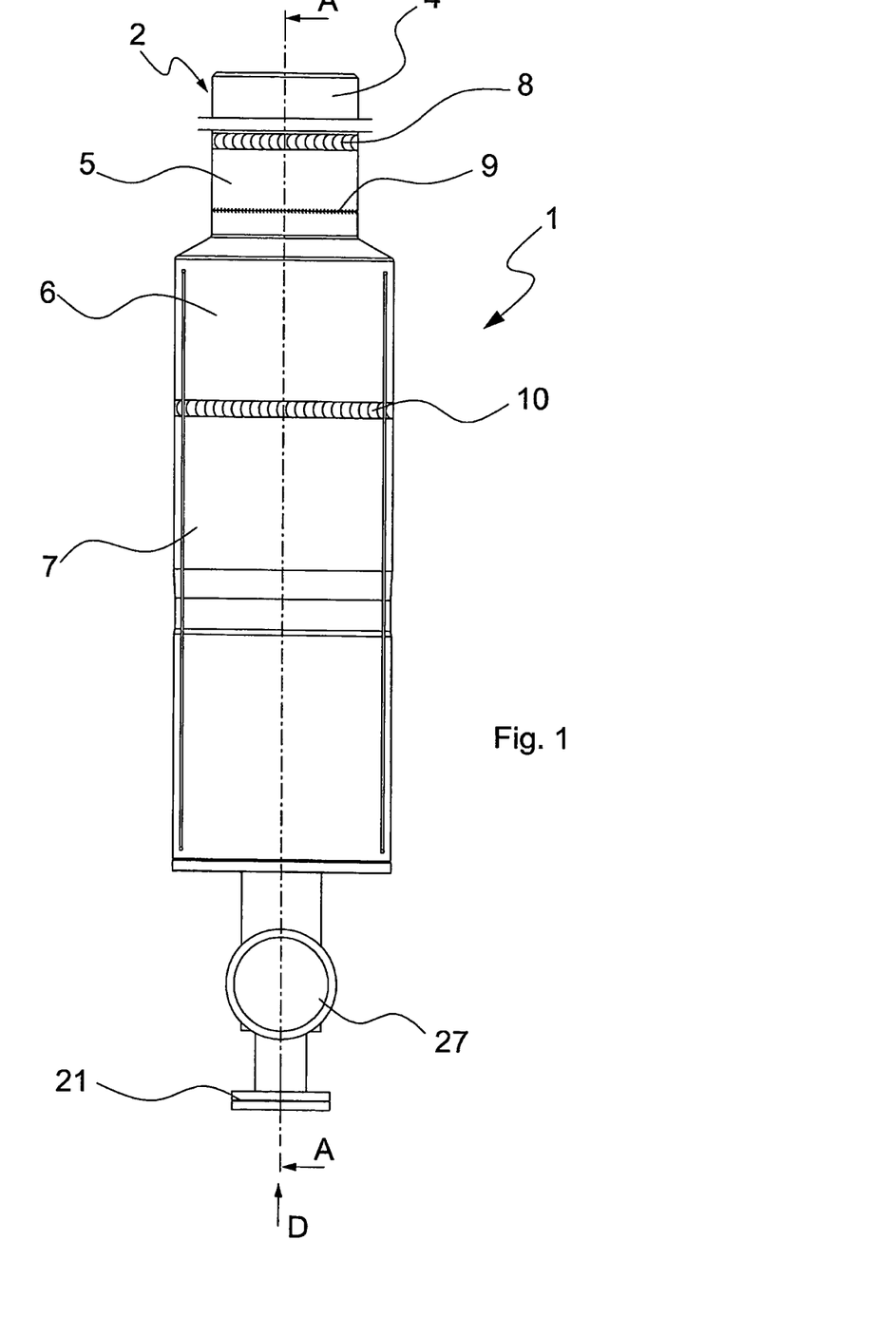
FIG. 1 shows a first side view of the electrode according to the invention.
Figure 2:
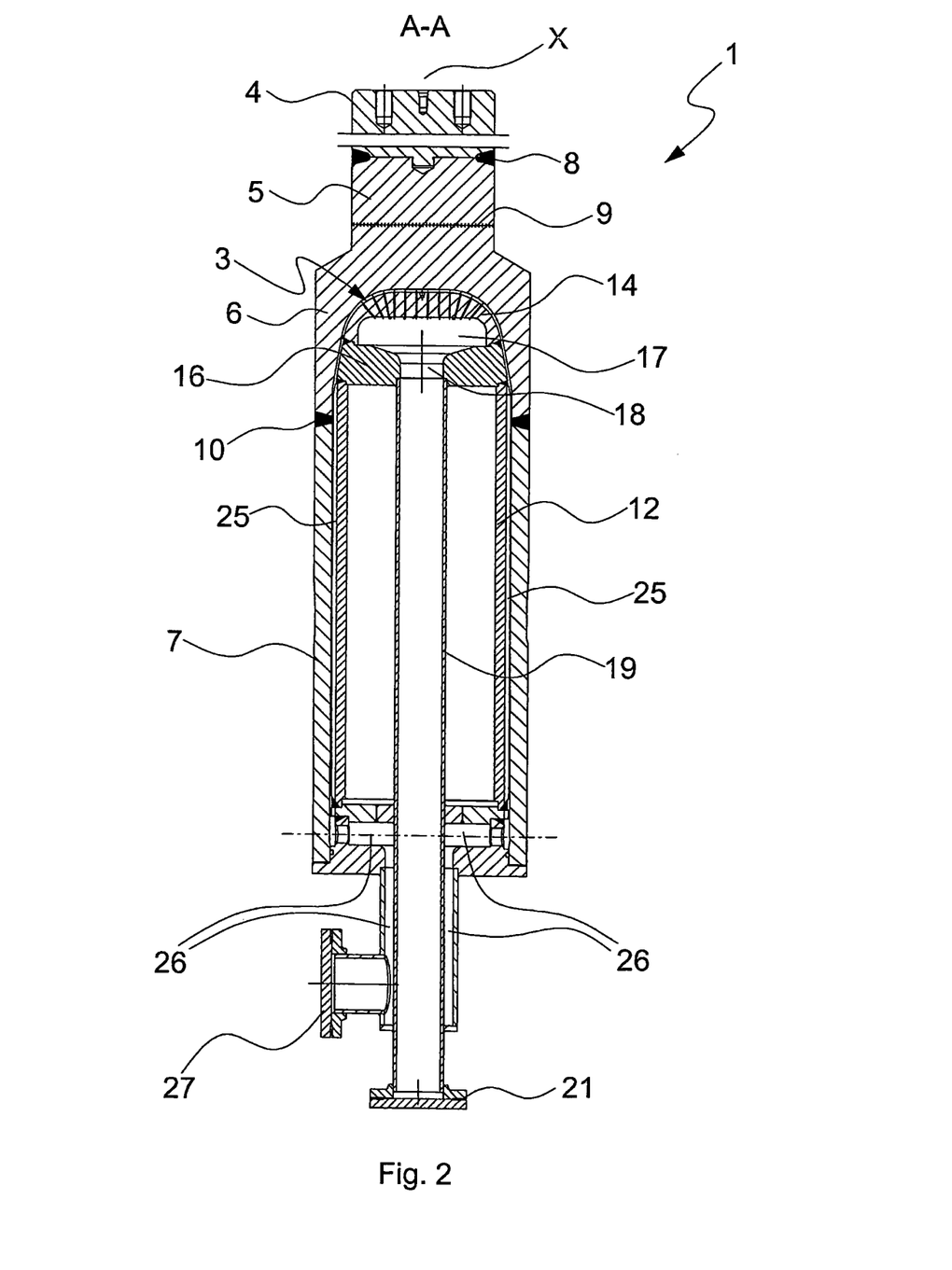
FIG. 2 shows a sectional view of the electrode in FIG. 1, along plane A-A.

In particular, in terms of structure, with reference to FIGS. 1 and 2, there are provided in the billet 2, from top to bottom:
a first steel portion 4;
a second steel portion 5, welded to said first steel portion 4;
a third copper portion 6, welded to said second steel portion 5;
a fourth copper portion 7, welded to said third copper portion 6.

The third copper portion 6 has a variation of section, in particular an enlargement from the top towards the bottom of the cross section thereof with reference to FIG. 2.

FIGS. 1 and 2 show a steel-steel welding cordon 8 between first portion 4 and second portion 5; a steel-copper cordon or welding line 9 between second portion 5 and third portion 6; a copper-copper welding cordon 10 between third portion 6 and fourth portion 7.

The fourth copper portion 7 substantially consists of a cylindrical tube. The third copper portion 6 at its bottom includes a recess 13, made in the wider portion of the third portion 6. Second steel portion 5 and third copper portion 6 define the so-called "spacer" to conveniently space the cooling zone of the electrode from the steel part of billet 2 which will become liquid during the operation of the arc furnace. The copper part and the steel part of the billet 2 which will remain solid are welded together to ensure the passage of current and the thermal continuity.

Advantageously, the cooling means 3 are accommodated, at least partially, in the longitudinal cavity 50 defined by the inside of the cylindrical tube 7 and by said recess 13 of the third copper portion 6. Spacer 5, 6 and cylindrical tube 7 define the so-called electrode jacket.

Figure 6A:
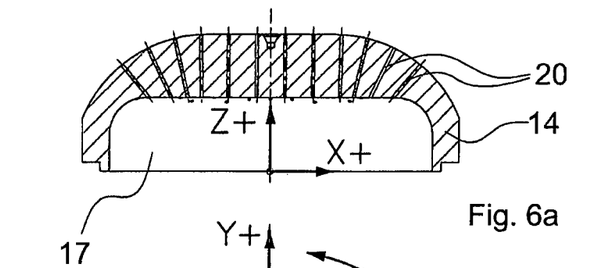
FIG. 6a shows a sectional side view of a component of the cooling system of the electrode of the invention.
Figure 6B:
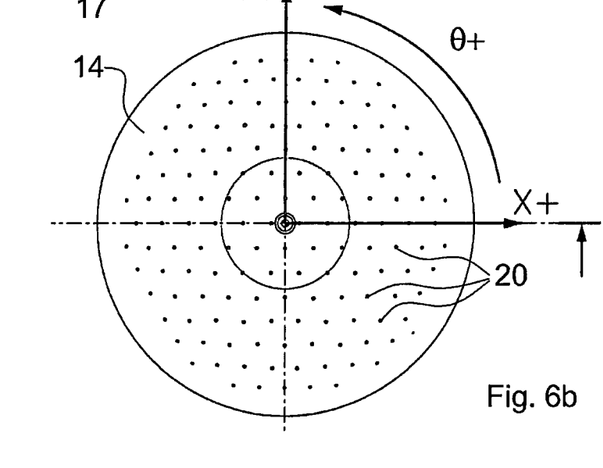

The cooling means 3 comprise a cooling lance substantially cylindrical 11 in preferably metal material, in turn comprising the following elements:
a cylindrical tube 12 having an outer diameter slightly smaller than the inner diameter of the cylindrical tube 7;
a convex or substantially flat lid 14 provided for closing a first end of said tube 12, provided in the outer wall thereof with a plurality of channels 20, e.g. in shape of simple through holes;
a conveyer pipe 19 of the cooling fluid, e.g. water, passing within the tube 12 and coupled in said lid 14 so as to communicate with a collector 17 obtained within the lid itself. The tube 12 is preferably coaxial to said conveyer pipe 19.

Alternatively to the simple through holes 20, it is possible to provide threaded nozzles screwed on a corresponding threading of the through holes 20.

In a preferred variant, the lid 14 is associated with an annular element 16, in the central hole 18 of which the conveyer pipe 19 is inserted.

Advantageously, the central hole 18 has a flare towards the collector 17. Advantageously, with respect to the longitudinal axis X of the electrode, the collector 17 has a cross section area of at least 1.5 times the cross section area of the pipe 19 with respect to said longitudinal axis X. In a preferred variant, the cross section of the collector 17 is equal to at least double the cross section of the pipe 19.

If the pipe 19 and the collector 17 have a circular cross-section, the diameter of the collector 17 is preferably equal to 1.5 times the diameter of the pipe 19. In case of sections other than circular, the same relationship is preferably between the respective equivalent diameters.

The annular element 16 is integrally fixed, e.g. by means of welding, to the cylindrical tube 12.

The same lid 14 may be integrally fixed, e.g. by means of welding, above said annular element 16, thus defining the collector 17 therewithin.

The holes 20 are made in the thickness of the lid 14 by putting the inner collector 17 in communication with the exterior of the cooling means.

The lid 14 may have the shape of a hemispheric cap or of a dome more or less squashed at the top or of a substantially flat plate, according to the shape of the inner central surface of the electrode to be cooled down. Thus the profile of the recess 13 substantially corresponds to the outer profile of the lid 14.

The conveyer pipe 19 protrudes from the cylindrical tube 12 at the second end of the latter, that is from the opposite side with respect to the lid 14, and is connected to an inlet flange 21 of the cooling water.

Once the electrode is assembled, the lance 11 is accommodated within the electrode jacket. The shape of the recess 13 is such as to receive the lid 14 of the lance 11. A predetermined clearance or distance H is provided between the recess 13 and lid 14, at the inner central or primary surface 23 of the electrode to be cooled down, which, preferably, decreases from the inner side or secondary surface 24 of the electrode.

Figures 2A, 2B:
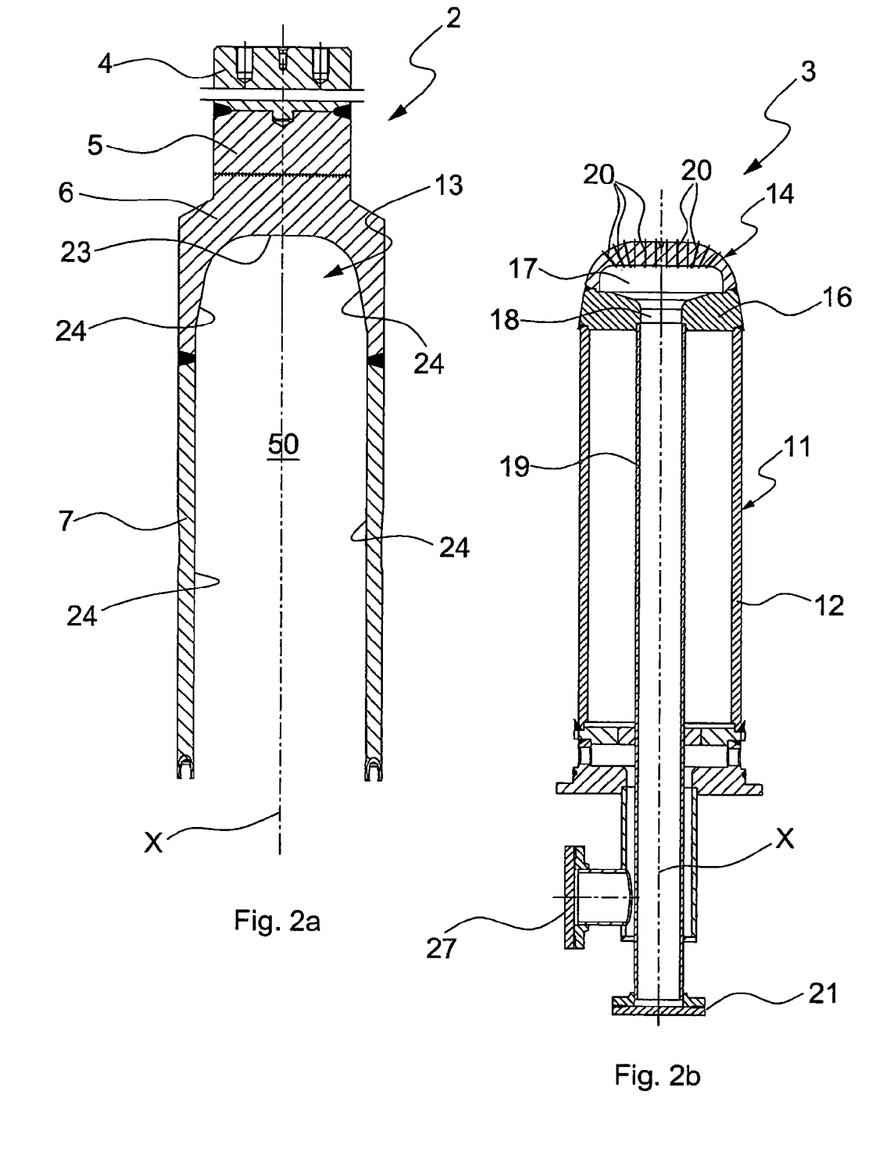
FIG. 2a shows a sectional view of a first part of the electrode in FIG. 1, along plane A-A.
FIG. 2b shows a sectional view of a second part of the electrode in FIG. 1, along plane A-A;"

Advantageously, the distance H between the primary surface 23, also called "wetted surface", and the corresponding surface of the lid 14, that is between the primary surface 23 and the outlet section of the holes or nozzles 20, is in the range between 5 and 30 mm, preferably between 6 and 12 mm. In a preferred variant, the distance H is equal to 8 mm. This distance H corresponds to the width of a first portion of the gap between cavity 50 and cooling means 3 or lance 11.

The width of the meatus 25 between tube 7 and tube 12 is preferably between 2 and 12 mm, said width of the meatus 25 corresponding to the width of a second portion of the gap between cavity 50 and cooling means 3 or lance 11.

Such a meatus 25 is connected to a discharge pipe 26 of the cooling water provided with an outlet flange 27.

The diameter "$d_i$" of the holes or nozzles 20 is advantageously in the range between 1 and 10 mm, preferably between 1 and 5 mm. In a preferred variant, the diameter "$d_i$" is equal to 3 mm.

Instead, with regards to the distribution of the holes 20 on the lid 14, the spacing between the holes 20, indicated with $L_d$, is a function of the diameter of the holes, preferably but not necessarily equal to a multiple of said diameter. The distribution may be uniform or not uniform on the surface of the lid 14. The spacing $L_d$ is in the range between 3 and 15 times the diameter $d_i$ of the holes 20, preferably in the range between 6 and 11 times the diameter of the holes. In a preferred variant, $L_d$ is equal to 31.5 mm.

The distribution criteria of the holes on the lid 14 is based on an optimal coverage of the primary surface 23 to be cooled down by part of the whale of high-efficiency cooling regions generated by the strike of the individual jets.

Advantageously, the holes 20 are made in the lid 14 so as to have a longitudinal axis thereof substantially perpendicular to the plane tangent to the outlet section thereof, that is substantially perpendicular to the corresponding portion of primary surface 23.

Moreover, the primary surface 23 or "wetted area" may be planar or curved and the extension thereof in terms of equivalent diameter $D_{eq}$ depends on the diameter of the billet 2 and has a maximum value of about 700 mm, preferably in the range between 250 and 600 mm. In a preferred variant, $D_{eq}$ is equal to 550 mm.

Figure 5:
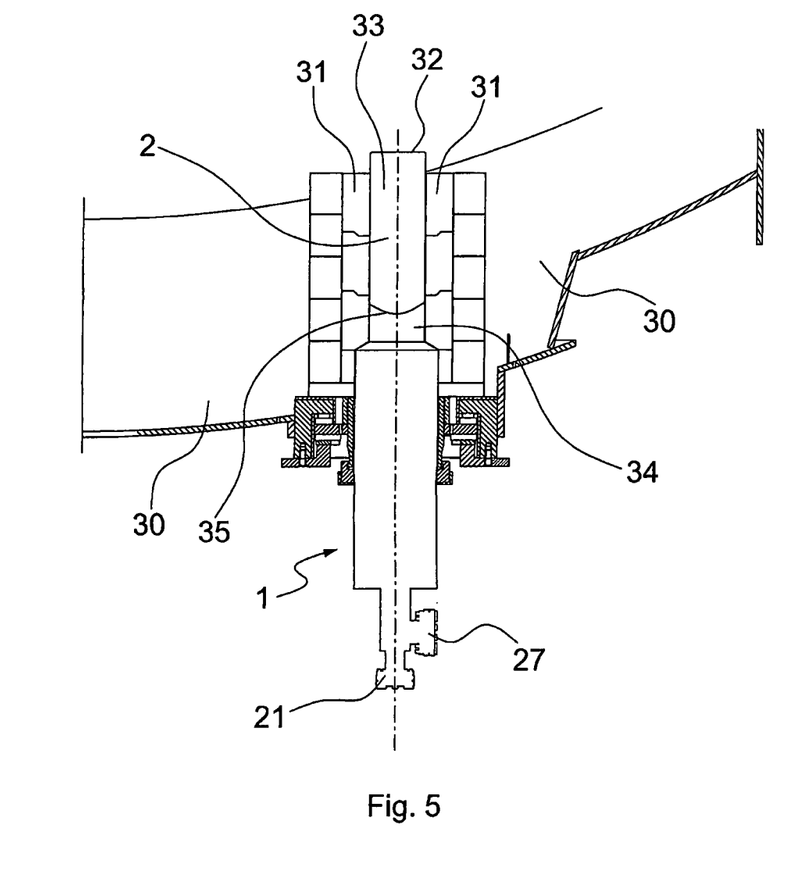
FIG. 5 shows a view of the electrode of the invention incorporated within the hearth of the arc furnace.

As illustrated in FIG. 6, the bimetallic billet 2 of the bottom electrode 1 is incorporated in the refractory hearth 30 of a continuous direct current arc furnace. Within the hearth 30, the billet 2 is surrounded by at least an order of annular refractory ferrules 31. The top end 32 of the billet 2 is in contact with the liquid metal bath (not shown) within the furnace. Said contact with the liquid metal, together with the effect of the passing of high currents along the billet itself, determines the formation along the billet 2 of a top liquid part 33 and of a bottom solid part 34, separated by an interface zone 35.

The cooling liquid of the electrode, preferably but not necessarily water, is continuously introduced with a predetermined flow in the conveyer pipe 19, it flows along it until arriving at the central hole 18 of the annular element 16 thus reaching the collector 17 inside the lid 14.

It is possible to provide the use of other cooling liquids alternatively to the water, such as, e.g. liquid metals such as sodium and eutectics of various compositions.

Advantageously, the central hole 18 of the first annular element 16 has a flare towards the collector 17 for minimizing load losses and recovering the highest pressure within the collector 17. The pressure of the cooling liquid within the collector 17 is in the range between 1 and 15 barg, preferably equal to about 12 barg.

From the collector 17, also called "bottom collector", the liquid is perpendicularly injected onto the primary copper surface 23 through the plurality of the holes 20. The speed $v_{jet}$ of the liquid jets exiting the holes 20, which affects the local transfer of heat, has a maximum value of 50 m/s, preferably in the range between 25 and 30 m/s. In a preferred process variant, such a speed is equal to about 27 m/s. The speed of the liquid jets, continuously exiting the holes 20, is such to prevent any possibility of evaporation of the liquid in contact with the inner surface of the copper part of the electrode.

The distribution of the holes 20 and the process parameters are such to obtain a maximum thermal flow through the copper part of the electrode equal to about 20 MW/m².

Advantageously, a series of thermocouples 40 is provided (FIGS. 3 and 4) installed in the copper slug of the anode, in particular the third section 6, to map the thermal flow which develops through the copper part of the electrode.

Figure 3:
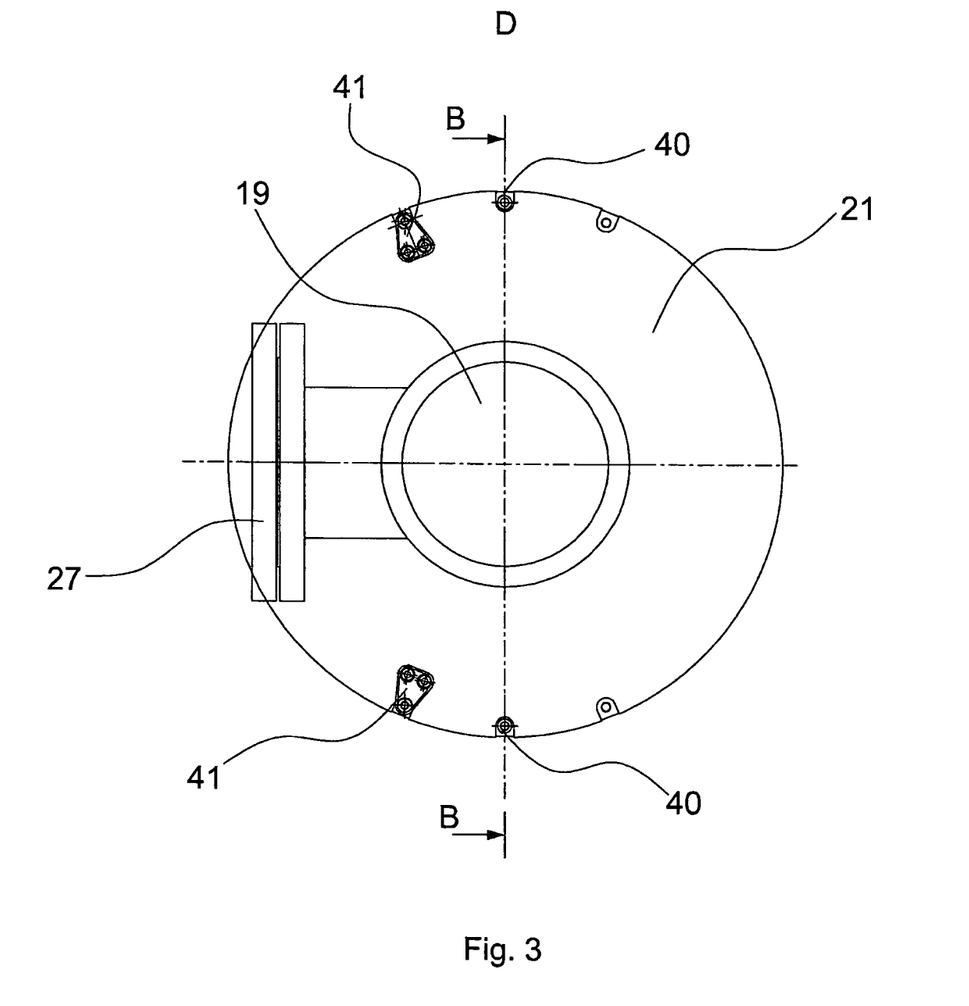
FIG. 3 shows a bottom view of the electrode in FIG. 1.
Figure 4:
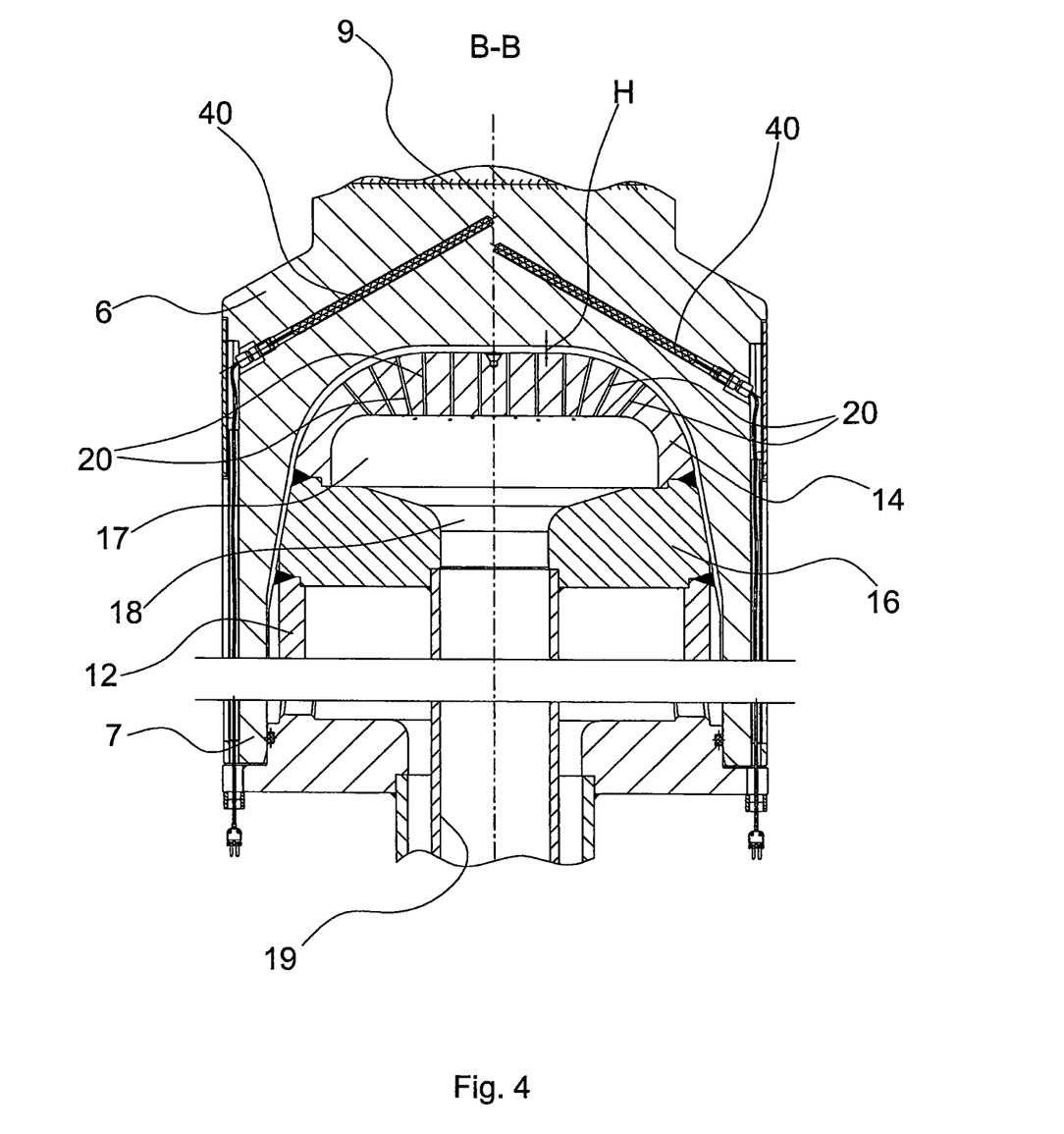
FIG. 4 shows a sectional view of the electrode in FIG. 3, along plane B-B.

In a preferred variant, the thermocouples 40 are accommodated inclined at about 60° with respect to the longitudinal axis of the electrode and the front ends thereof are arranged close to said axis. This configuration of the thermocouples 40 has the advantage of permitting the continuous monitoring of the status of one of the most thermo-mechanically stressed zones.

Moreover, within the tube 7 and the copper section 6 of the electrode, housings are provided for thermoresistances 41, as further control instrument of temperature and diagnostics.

Thus the cooling system of the electrode of the invention permits to generate and discharge cooling liquid jets in a zone, or "top collector", delimited at the top by the primary surface 23 to cool down.

All jets are confined, perpendicular to the corresponding portion of the primary surface 23, and totally immersed in the same cooling liquid which already occupies the "top collector" and the side meatus 25 between tube 12 and tube 7. Advantageously, when operating, none of the passing zones of the liquid contain air but are totally occupied by the liquid itself. Therefore, the cooling system of the electrode of the invention operates as a single-phase (only water, no air within the system) and closed system. Said system may operate indifferently with high or low outlet pressure.

The configuration of the lid 14, cap or holed plate shaped, and of the zone between primary surface 23 and the same cap or holed plate is such to promote the substantially perpendicular strike of the liquid jets on the primary surface 23 and the successive flow descending towards the discharge of the cooling system where the cooling effect of the jets was completely converted into turbulent convection.

The liquid jets strike on the "wetted area" 23 which is the cooled top area of the anode; the rest of the inside of the copper jacket of the electrode, that is the meatus 25, being cooled by the descending flow of liquid coming from said cooled top area (secondary cooling).

Experimental tests have confirmed that the strike of the confined liquid jets is a very effective means for obtaining high cooling efficiencies of the copper part of the bottom electrode of a continuous direct current arc furnace.

A turbulent jet which perpendicularly strikes on a flat surface has generated, in the region close to the stagnation point of the jet, among the highest heat exchange coefficient values encountered in single-phase convection (no air).

This performance is due to the thinning of the boundary layer in the strike zone of the jet thus permitting to put the cooling liquid in direct contact in such a zone with the exchange surface. Furthermore the stagnation pressure, that is the pressure which is recorded in the deceleration zone of the jet where it strikes on the surface, significantly increases the saturation temperature, that is the temperature at which boiling phenomena occur for a given pressure. Thus, due to these phenomena, it is possible that high wall temperatures and, accordingly, high thermal flows exist in the stagnation zone without boiling conditions necessarily establish.

Pressure and heat exchange quickly decrease as the distance increases from the stagnation point of the jet. Accordingly, to cool down large portions of surface the embodiment was conceived of a series of jets which perpendicularly strike on the flat surface. Hydrodynamics between the various jets significantly differs from the cooling conditions of the individual jet. In particular, in the zones where the flow lines coming from adjacent jets come together, stagnation zones are created on the secondary surface to be cooled down in which a local increase of the heat exchange coefficients will occur.

Thus, with respect to the single-jet configuration, an increase will occur of the average values of the heat exchange coefficients on the entire surface hit by the liquid according to the reciprocal distances between the jets.

The solution with a plurality of liquid jets which substantially perpendicularly strike said flat surface was then validly tested on a curvilinear surface, e.g. a hemispheric surface.

The invention claimed is:

1. An electrode for a direct current electric arc furnace for melting metals, adapted to be housed in a bottom of said furnace, comprising:
    a bimetallic bar, having an inner profile and defining a longitudinal axis, comprising along the longitudinal extension thereof a first steel portion, a first end of which is adapted to come in contact with a metal bath within the furnace, and a second copper portion welded to a second end of said first steel portion;
    cooling means having an outer profile which substantially corresponds to the inner profile of the bimetallic bar, the cooling means being configured to cool down said bimetallic bar;
    a cavity obtained within said second copper portion, in which said cooling means are at least partially housed;

a gap between said cavity and said cooling means;

wherein the cooling means comprise a collector, the collector being placed at a first end of the cooling means, having an end wall provided with a plurality of channels which put into communication said collector with a first portion of said gap which is proximal to said first steel portion;

a first pipe for conveying a cooling liquid towards the collector;

wherein the collector has a cross section area of at least 1.5 times the cross section area of the first pipe with respect to said longitudinal axis, and wherein at least some of the channels have a longitudinal axis thereof perpendicular to a plane tangent to the respective outlet section, whereby a plurality of jets of cooling liquid substantially perpendicular to a primary surface of the cavity proximal to said first steel portion is produced in the first portion of the gap.

2. The electrode according to claim 1, wherein said end wall is a lid, either convex or substantially flat, closing a tube of the cooling means, said tube being coaxial and, external to said first pipe of the cooling liquid.

3. The electrode according to claim 2, wherein said lid is associated with an annular element, wherein the first pipe in engaged in the central hole of said annular element.

4. The electrode according to claim 3, wherein the central hole has a flare towards the collector.

5. The electrode according to claim 4, wherein said lid has the shape of a hemispheric cap or a dome squashed at the top or a substantially flat plate, according to the shape of the primary surface to be cooled.

6. The electrode according to claim 5, wherein said first pipe protrudes from the tube on the side opposite to the lid and is connected to an inlet flange of the cooling liquid.

7. The electrode according to claim 6, wherein the spacing ($L_d$) between the outlet sections of the channels is in the range from 3 to 15 times the diameter of said channels.

8. The electrode according to claim 7, wherein the width of said gap decreases from said primary surface to a secondary side surface of said cavity.

9. The electrode according to claim 8, wherein said first portion of the gap, at said primary surface, has a width in the range from 5 to 30 mm.

10. The electrode according to claim 9, wherein a second portion of the gap which is distal to said first steel portion, at said secondary surface, has a width in the range from 2 to 12 mm.

11. The electrode according to claim 10, wherein said second portion of the gap is connected to a second exhaust pipe of the cooling liquid.

12. The electrode according to claim 11, wherein the cooling liquid is water.

13. The direct current electric arc furnace for melting metals comprising at least one electrode according to claim 1 at its bottom.

* * * * *